Patented Aug. 30, 1932

1,874,584

UNITED STATES PATENT OFFICE

HEINRICH NERESHEIMER, OF LUDWIGSHAFEN-ON-THE-RHINE, AND WILLY EICHHOLZ, OF MANNHEIM, GERMANY, ASSIGNORS TO GENERAL ANILINE WORKS, INC., OF NEW YORK, N. Y., A CORPORATION OF DELAWARE

PRODUCTION OF NEW VAT DYESTUFFS

No Drawing. Application filed October 25, 1929, Serial No. 402,539, and in Germany November 17, 1928.

The present invention relates to the production of new vat dyestuffs.

In the U. S. Patent No. 1,588,451, granted June 15th, 1926 to Wilhelm Eckert and Heinrich Greune there is described a vat dyestuff which is obtained by condensing the dianhydride of 1.4.5.8-naphthalenetetracarboxylic acid with ortho-phenylene diamine. The said vat dyestuff is a red powder, soluble in concentrated sulfuric acid with a yellowish brown color and gives a green vat from which cotton is dyed after exposure to the air a brilliant yellowish red. In claim 6 of the aforesaid Patent No. 1,588,451 it is further stated that this product has one of the following formulæ, namely

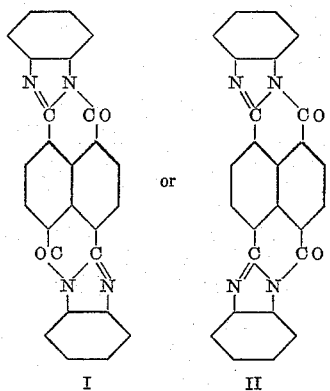

I    II

We have found that the aforesaid red dyestuff obtainable according to the U. S. Patent No. 1,588,451 is converted into a product giving brilliant orange dyeings of excellent fastness by treating it with acid oxidizing agents, for example, with chromic acid in moderately dilute sulfuric acid.

As regards the nature of the aforesaid reaction, we assume that the red dye stuff of Patent No. 1,588,451 is not a uniform product, but is composed of two components each of which probably corresponds to one of the afore said Formulæ I and II, the one component dyeing cotton from the vat bluish red shades and the other bright orange shades. By the aforesaid treatment with acid oxidizing agents, probably only the bluish red component is attacked and destroyed by the oxidizing agents, whereas the orange component remains unaltered. As regards the constitution of the orange constituent, we presume that it corresponds to that indicated by the above Formula I. It should be noted, however, that we do not wish to bind ourselves to this explanation.

Depending on the conditions under which the oxidation treatment is carried out, more or less of the bluish red component is destroyed and accordingly the products obtained according to our present invention vary in shade from a bright orange to orange red.

The orange red products obtainable by the process according to our present invention may be subjected to further treatment with acid oxidizing agents and thereby converted into the bright orange products. The bright orange products crystallize from high boiling organic solvents in uniform needles and do not substantially change their shade when treated in 60 per cent sulfuric acid at a temperature of between about 120° and 125° C. with chromic acid.

The following examples will further illustrate the nature of this invention, but the invention is not restricted to these examples. The parts are by weight.

Example 1

To a solution or suspension of 10 parts of the red vat dyestuff obtainable by the condensation of 1.4.5.8-naphthalenetetracarboxylic acid dianhydride with o-phenylene diamine in 320 parts of 60 per cent sulfuric acid, 20 parts of chromic acid are gradually added at a temperature of from 120° to 125° C. while well stirring. After stirring for about 3 hours at the said temperature, the reaction mixture is poured into water, and the dyestuff which separates out is filtered off and purified by boiling up with dilute caustic soda solution. After drying, it is an orange powder, and may be obtained in the form of orange needles by crystallization from solvents of high boiling point, for example alpha-chlor-naphthalene, or by sublimation in vacuo. It dissolves in concentrated sulfuric acid giving an orange coloration, and gives a red brown vat with a green dichroism, from which cotton is dyed brilliant orange shades.

Example 2

10 parts of the red vat dyestuff employed in Example 1 are dissolved in 200 parts of sulfuric acid of 96 per cent strength and 120 parts of water are added. 27 parts of potassium bichromate are then gradually introduced into the suspension thus obtained, at a temperature of from 105° to 110° C. The whole is stirred for a period of about half an hour at the same temperature and is then worked up in the manner described in Example 1. Although the reaction product is similar in all its other properties to the reaction product obtained in Example 1 it dyes cotton considerably redder orange shades.

Example 3

A solution of 5 parts of potassium permanganate in 150 parts of water is run, while cooling, into a solution of 10 parts of the initial material employed in Example 1 in 110 parts of sulfuric acid of 90 per cent strength. After the oxidation is finished, the reaction mixture is worked up, as described in Example 1. The oxidation may be repeated, if desired. Dyestuffs dyeing cotton orange shades with a more or less strong reddish tinge are obtained according to the amount of oxidizing agent employed. The properties of the dyestuffs are very similar to those of the dyestuffs described in Examples 1 and 2, as are also the shades obtained therewith.

What we claim is:—

1. The process of producing new vat dyestuffs, which comprises treating the red vat dyestuff obtainable by the condensation of 1.4.5.8-naphthalenetetracarboxylic acid dianhydride with ortho-phenylenediamine with an acid oxidizing agent.

2. The process of producing new vat dyestuffs, which comprises treating the red vat dyestuff obtainable by the condensation of 1.4.5.8-naphthalenetetracarboxylic acid dianhydride with ortho-phenylenediamine with chromic acid in sulfuric acid solution.

3. As a new article of manufacture the practically uniform vat dyestuff probably corresponding to the formula:

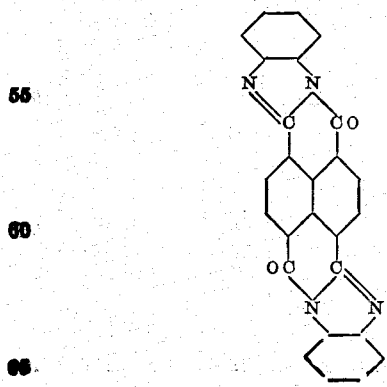

which dyestuff is an orange powder soluble in concentrated sulfuric acid with a yellowish brown color, gives a green vat, dyes cotton brilliant orange shades of excellent fastness, crystallizes from high boiling organic solvent in uniform needles and does not substantially change its shade when treated in 60 per cent. sulfuric acid at a temperature of between about 120 and 125° C. with chromic acid.

In testimony whereof we have hereunto set our hands.

HEINRICH NERESHEIMER.
WILLY EICHHOLZ.